(12) United States Patent
Harris et al.

(10) Patent No.: US 6,866,511 B1
(45) Date of Patent: Mar. 15, 2005

(54) ELECTRONIC DEVICE FOR THE PREPARATION OF MIXED DRINKS

(75) Inventors: David Harris, Nashua, NH (US); Rudy Woodard, Nashua, NH (US); Scott Rubenstein, Nashua, NH (US)

(73) Assignee: Brookstone Purchasing Inc., Merrimack, NH (US)

( * ) Notice: Subject to any disclaimer, the term of this patent is extended or adjusted under 35 U.S.C. 154(b) by 0 days.

(21) Appl. No.: 09/991,810

(22) Filed: Nov. 23, 2001

(51) Int. Cl.$^7$ ............................................. G09B 19/00
(52) U.S. Cl. ..................... 434/219; 235/103; 222/48; 222/191; 220/568
(58) Field of Search .................. 434/219; 220/568, 220/62.11; D10/46.2; 222/48, 191; 366/205; D7/378; 235/103; 377/114; 708/133

(56) References Cited

U.S. PATENT DOCUMENTS

| | | | |
|---|---|---|---|
| D22,768 S | | 9/1893 | Dungan |
| 1,744,328 A | * | 1/1930 | Morley ..................... 215/383 |
| D157,364 S | | 2/1950 | Freshley ..................... D36/8 |
| 4,073,192 A | | 2/1978 | Townsend ..................... 73/429 |
| 4,482,327 A | * | 11/1984 | Brady ......................... 434/219 |
| 4,588,004 A | * | 5/1986 | Herbert ....................... 141/377 |
| 4,736,871 A | * | 4/1988 | Luciani et al. ................ 222/25 |
| 5,299,356 A | * | 4/1994 | Maxwell, III ................. 30/322 |
| D386,941 S | * | 12/1997 | Barker ........................ D7/378 |
| 5,983,783 A | | 11/1999 | Archard et al. |
| 6,404,838 B1 | * | 6/2002 | Hall ............................. 377/16 |
| 2002/0009016 A1 | * | 1/2002 | Ancona et al. ............. 366/205 |
| 2002/0176320 A1 | * | 11/2002 | Wulf et al. ................. 366/205 |

FOREIGN PATENT DOCUMENTS

WO    WO 93/05382    * 3/1993    ........... G01N/11/14

* cited by examiner

*Primary Examiner*—Xuan M. Thai
*Assistant Examiner*—Cameron Saadat
(74) *Attorney, Agent, or Firm*—Nixon Peabody LLP

(57) ABSTRACT

An electronic bar tool is disclosed that is capable of displaying titles and recipes for a plurality of mixed drinks. The apparatus comprises a handle having a display device and a measuring device for measuring a volume of liquid. The display displays the drink ingredients and the necessary volumes and may also indicate to a user the type of glass the drink is to be served in, whether the drink should be shaken or stirred, and whether the drink should be served with or without ice. The drink titles and recipes may be stored in a memory that may be changed through a communications port.

13 Claims, 6 Drawing Sheets

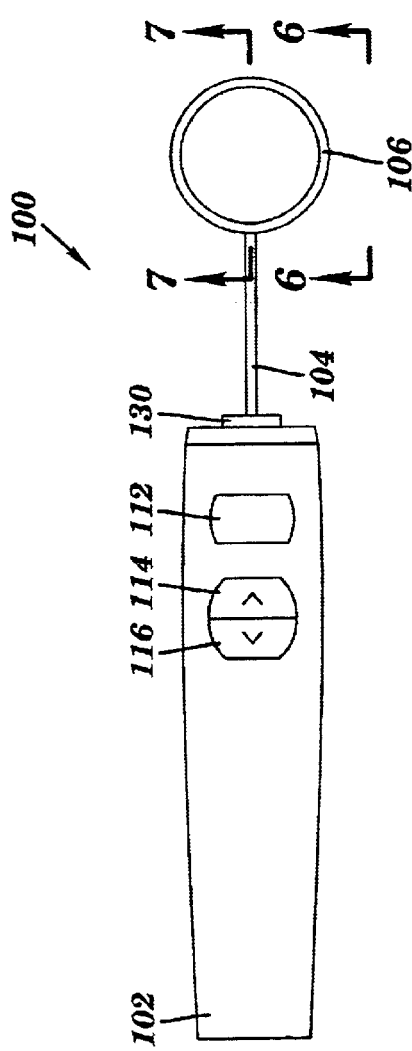
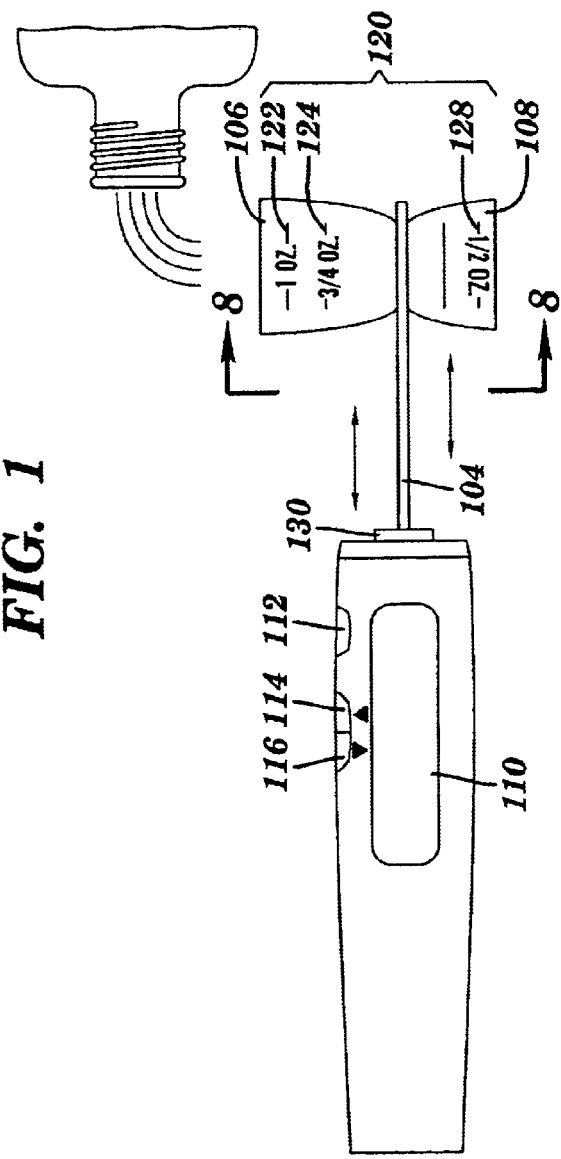
FIG. 1
FIG. 2

US 6,866,511 B1

ELECTRONIC DEVICE FOR THE PREPARATION OF MIXED DRINKS

FIELD OF THE INVENTION

The present invention relates generally to an electronic recipe device with measuring containers for preparing, e.g. food and drinks, and will be described in connection with a handheld electronic device for preparing alcoholic mixed drinks. However, other utilities are contemplated.

BACKGROUND OF THE INVENTION

People have enjoyed mixed alcoholic drinks for many years. Remembering how to properly prepare an alcoholic drink can be difficult. Certain mixed drinks contain five or more different ingredients. The ingredients may comprise different types of alcohol, juices, soda, water, milk, etc. For example, a long island iced tea has eight ingredients. Knowing the proper ingredients is not enough. A bar tender must also know how much of each ingredient to add, what type of glass the drink should be prepared in, whether the drinks should be shaken or stirred, and whether it should be served with or without ice. Learning the recipe for each of these different drinks is very time consuming.

Professional bartenders must study 100's of different drinks before they can competently work in a bar. Books are available, for example, Mr. Boston books, to help bar tenders and the general public learn how to mix their favorite drink. A problem with books is that they are susceptible to damage by spilled drinks.

SUMMARY OF THE INVENTION

It is an object of the present invention to provide a bar tool comprising a handle, a display for displaying an ingredient of a drink recipe, the display being coupled to the handle, and a measuring device extending from the handle for measuring the ingredient.

It is another object of the present invention to provide a bar tool comprising a handle, a memory disposed in the handle, the memory storing at least one drink title and an associated drink recipe, a display coupled to the handle, the display capable of displaying the drink title and the associated drink recipe, and a measuring device extending from the handle for measuring an ingredient listed in the drink recipe.

BRIEF DESCRIPTION OF THE DRAWINGS

The above and other objects, feature, and advantages of the present invention will be apparent in the following detailed description thereof when read in conjunction with the appended drawings wherein the same reference numerals denote the same or similar parts throughout the several views, and wherein:

FIG. 1 is top view of a bar tool consistent with the present invention;

FIG. 2 is display side view of the bar tool of FIG. 1;

DETAILED DESCRIPTION OF THE INVENTION

Figure 6:
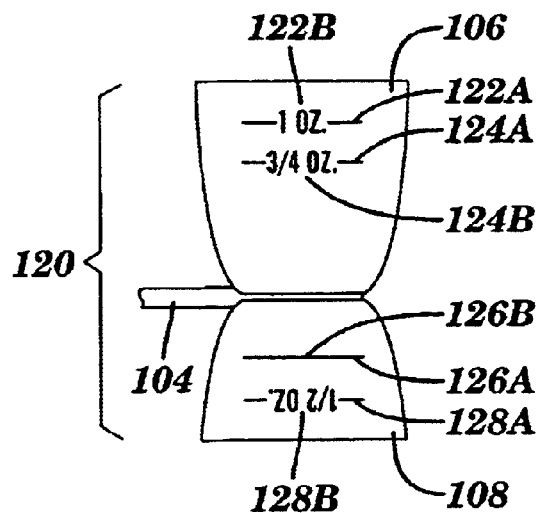
FIG. 6 is an enlarged view of the measuring containers of FIG. 2.
Figure 9:
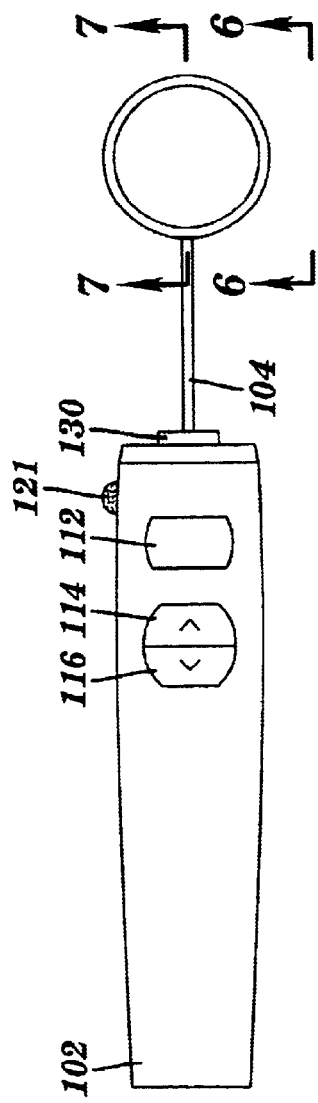
FIG. 9 is a view, similar to FIG. 1, of an alternative embodiment of bar tool consistent with the present invention.
Figure 10:
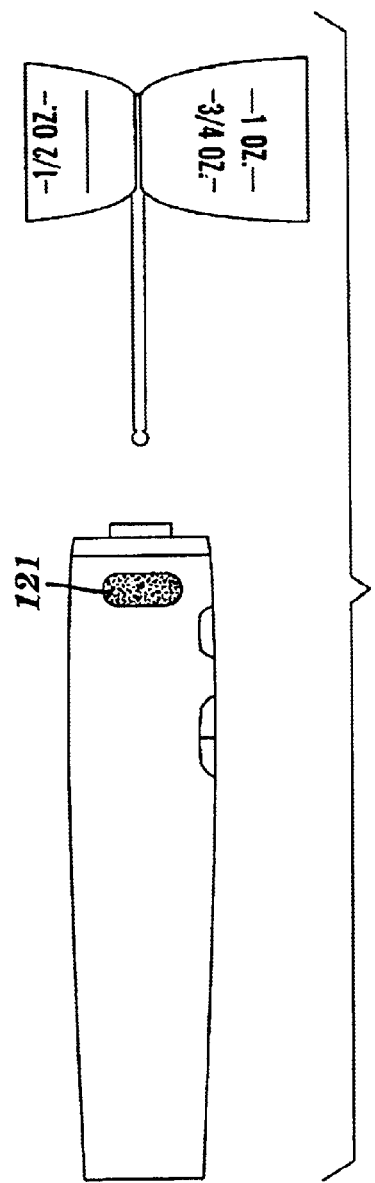
FIG. 10 is a view, similar to FIG. 2, but from the back side, of the alternative embodiment of FIG. 9, and shown in exploded view.

FIGS. 1 and 2 are a top view and side view respectively of a bar tool made in accordance with the present invention. The apparatus comprises a measuring device 120 coupled to a handle portion 102 by a bar 104. The measuring device 120 may comprise a first measuring container or jigger 106 and a second measuring container or jigger 108. The first measuring container 106 may have a larger volume capacity than the second measuring container 108. Both measuring containers 106 and 108 may include markings 122, 124, 126 and 128 to indicate the quantity of liquid in the container. As shown in FIG. 6, the markings may be made up of a line 122A, 124A, 126A, and 128A and accompanying text 122B, 124B, 126B, and 128B. The first measuring container 106 may include a marking 122 for 1 oz. and a marking 124 for 3 oz. Alternatively, other markings can be used for example 1.5 oz. and 1 oz. The second measuring container 108 may include a marking 128, for example, for ½ oz. If desired, bar 104 and measuring device 120 may be made removable from the end 130 of handle 102 for washing by means of a detent button 121 (see FIGS. 9 and 10). Bar 104 and measuring device 120 also may be rotatably mounted on post 104 in the end 130 of handle 102, to permit the user to select the jigger and jigger orientation (see arrows 131 in FIG. 8), without having to rotate the handle 102. The measuring device 120 and the bar 104 may be made of stainless steel or other suitable materials. The handle 102 may comprise a display device 110, and actuators 112, 114, and 116, to be described in detail below.

Figure 3:
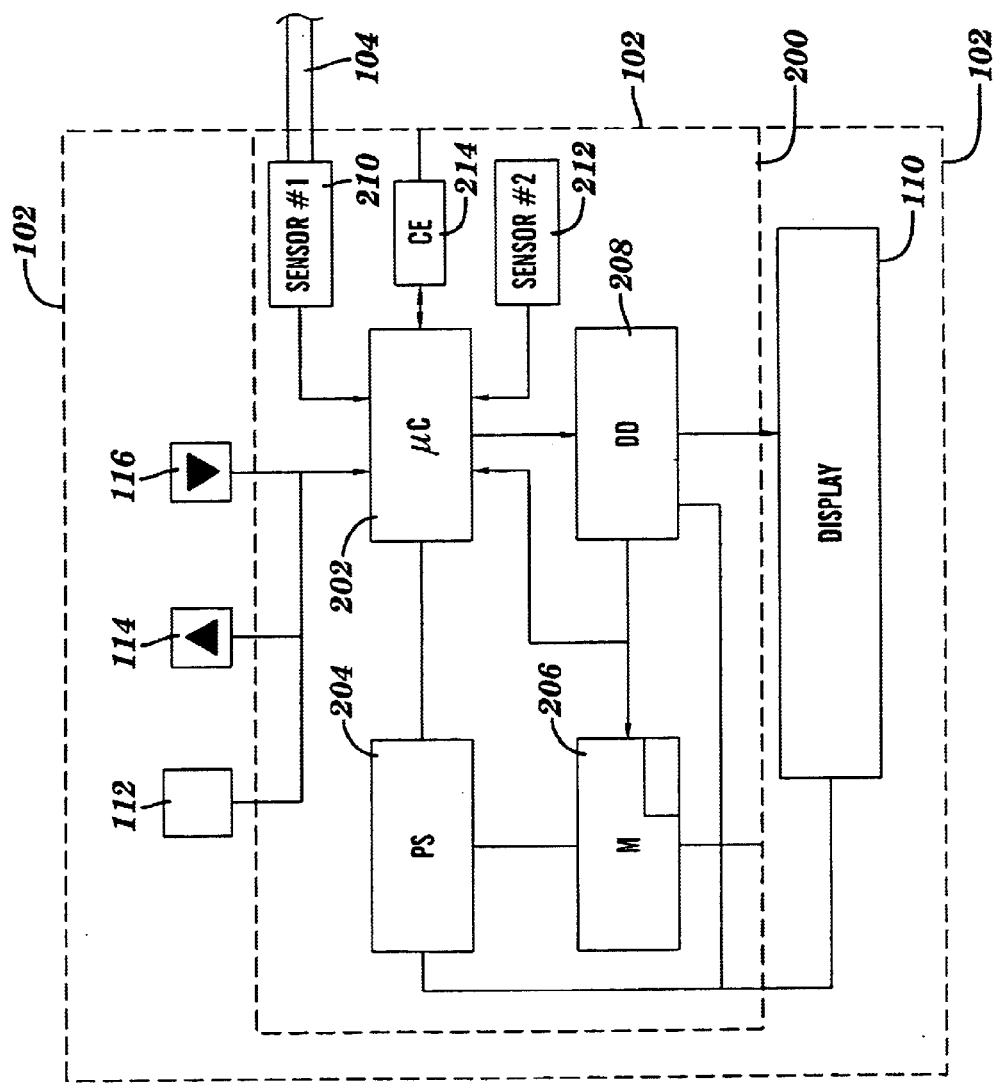
FIG. 3 is a block diagram of a control circuit for use in the present invention.

FIG. 3 shows a simplified block diagram of a control circuit 200 that may be housed in the handle 102. The control circuit 200 may comprise a controller 202, a power source 204, a memory 206, a display driver 208, a first sensor 210, a second sensor 212, and a communications port 214. The power source 204 is preferably a DC power source, more preferably a battery, and even more preferably a rechargeable battery. The power source 204 provides necessary power to all components. The memory 206 may be an EEPROM and may be used to store drink titles and drink recipes for later recall. The processor 202, the memory 206, and/or the display driver 208 may be combined into a single component. The processor 202 may receive inputs from the actuators 112, 114, and 116, sensors 210 and 212, and communications port 214. Actuator 112 may operate as an on/off switch, an enter button, or a sequence button. Actuators 114 and 116 may be used to scroll up and down through a menu of drink titles and ingredients listed in drink recipes stored in the memory 206 and displayed in the display 110. The first sensor 210 may sense the orientation of the bar 104 and the coupled measuring containers 106 and 108 relative to the handle 102. When the handle 102 is held in a horizontal position as shown in FIG. 2, the first sensor 210 can sense whether the bar 104 is inserted in the handle 102 such that the first measuring container 106 is oriented in a manner to provide retention of a liquid, i.e., a generally upwardly opening orientation or if the second measuring container 108 is oriented in a manner to provide retention of a liquid. The bar 104 may have some type of indicating feature or shape at the insertable end that allows the sensor 210 to sense the orientation. The second sensor may sense the rotation of the handle 102. After one of the measuring containers 106, 108 is filled with a liquid, the bartender will typically rotate the handle about its longitudinal axis in order to dispense the measured liquid into glass or mixing container. The second sensor 212 can sense if the handle has been rotated, i.e. 90° and send a signal to the controller 202. A simple Mercury switch or other suitable component that is capable of signaling an orientation will suffice. The controller 202 may respond to the signal by indexing the recipe to the next ingredient and displaying it in the display 110. Alternatively, or additionally, the recipe may be indexed to the next ingredient by actuating one of actuators 112, 114. The controller may be programmed to go to "sleep" after a certain time period of nonuse in order to preserve battery life. The second sensor 212 may also be used to awake the control circuit 200 if the control circuit 200 has gone to "sleep". The communications port 214 may be used to update or interrogate data stored in the memory 206. The communications port 214 may send and receive data to a coupled electronic device, i.e. a personal computer. The communications port 214 may utilize wireless or wired communications.

The controller 202 may communicate with the memory 206, the display driver 208, and the communications port 214. The display driver 208 may communicate with the display 110. Drink titles and recipes may be initially stored in the memory 206 and may be updated/changed through the communications port 214.

To prepare a mixed drink, the user may turn the bar tool 100 on by actuating the actuator 1112. The user then may scroll through the list of drink titles displayed on the display 110. The display 110 may be capable of displaying one or more lines of text. The drink titles may be stored alphabetically. However, if the electronic device is user programmable through the communications port 214, the drink titles can be arranged by any manner and the recipes can be modified or deleted. Upon finding the correct drink title, the user can actuate actuator 112. The controller 202 then may display the recipe in the display 110. The recipe may be listed in an order by type of alcohol, in an order first by the liquids to be measured in the first measuring container 108 and then by the liquids to be measured in the second measuring device 106, or by any desired order. The bar tool 100 may be turned off by pressing and holding the on/off actuator, i.e. for 2 or more seconds, or may have an automatic power saving circuit which powers down after a predetermined period.

Figure 4:
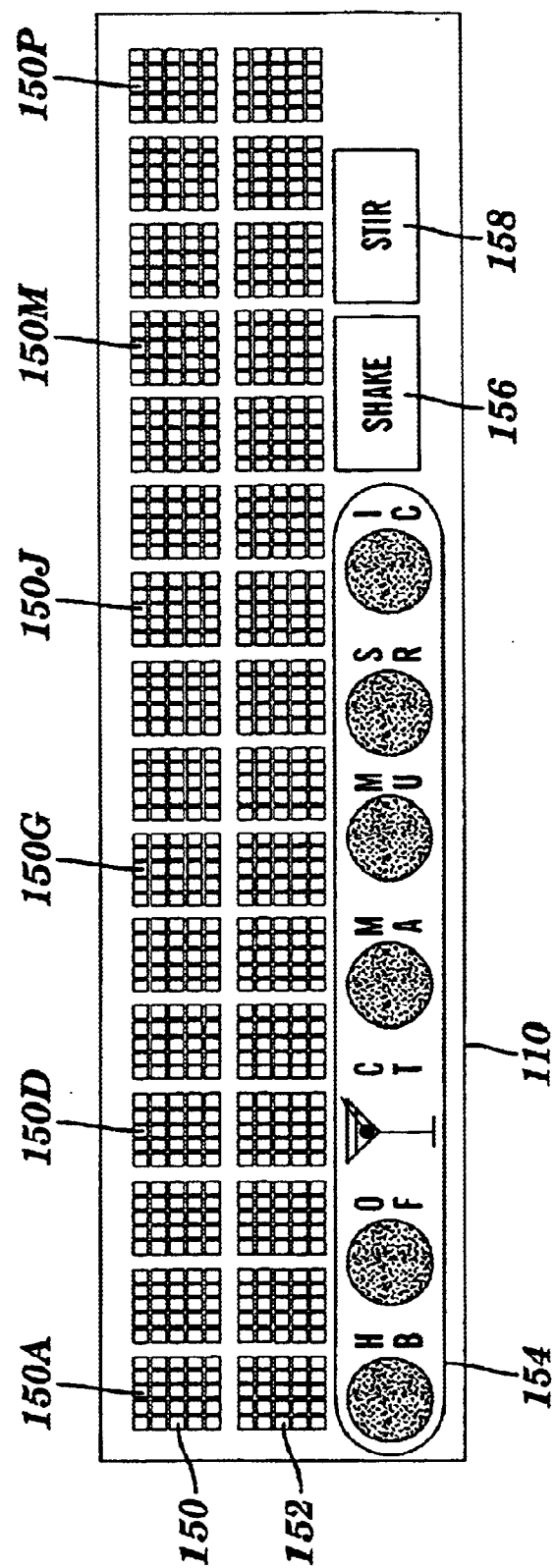
FIG. 4 is a display screen useable in bar tool of FIG. 1.

FIG. 4 shows a display screen 110 useable in the bar tool of the present invention. The display screen 110 may allow for the display of one or more lines of text. Each line of text may display a plurality of characters. In the embodiment shown in FIG. 4, the display 110 has two lines of text 150 and 152, with each line of text allowing the display of 16 characters 150A–150P. The characters may be used to display a drink title and a list of associated ingredients. The ingredients may be different types of alcohol, fruits, juices, or milk to be inserted into a glass or condiments, i.e. fruit slices and umbrellas, to accessorize the drink. The display 10 may also comprise icons 154. The icons 154 can indicate the proper drinking glasses, i.e. a cocktail glass, high ball glass, old fashion, etc. The display 10 may also comprise an icon 156 indicating that the drink being prepared should be shaken, an icon 158 indicating that the drink being prepared should be stirred, and text indicating that ice should be added to the drink being prepared. The proper icon may be lit continuously or flashed on and off to signal the user. Alternatively, this information could be displayed using the characters 150A–150P.

Figure 5:
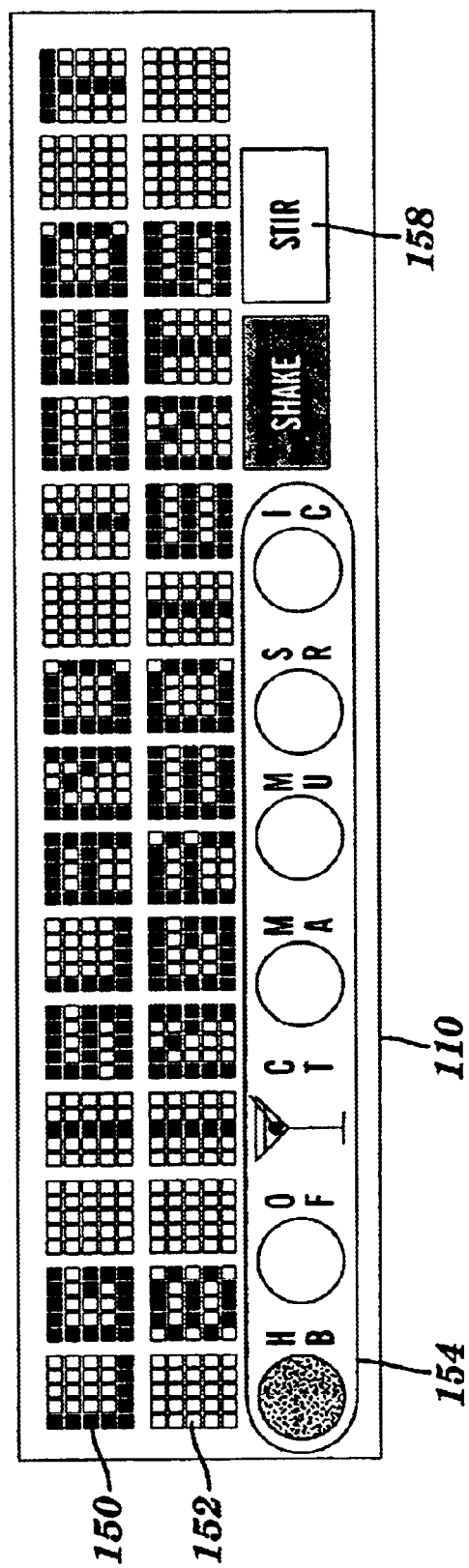
FIG. 5 is the display screen of FIG. 4 displaying a drink title and drink recipe.

FIG. 5 shows the display 110 displaying a recipe for a long island iced tea. The first line of text 150 and the second line of text 152 display ingredients to be added, the icon 154 displays the type of glass in which the drink should be served, and icon 156 displays that the drink should be shaken. After an ingredient is added to the glass, the recipe is advanced by touching actuators 114 or 116, and the first and second lines of text 150, 152 display the next ingredients to be added. The controller 202 may be signaled that an ingredient has been added either by receiving a signal from the second sensor 212 or one of the actuators 114, 116.

FIG. 6 shows an enlarged side view of the measuring device 120. The first measuring container 106 preferably has fill lines 122A and 124A and text 122B and 124B on the outside surface of the container. The second measuring container 108 preferably has fill lines 126A and 128A and text 126B and 128B on the outside of the container.

Figure 7:
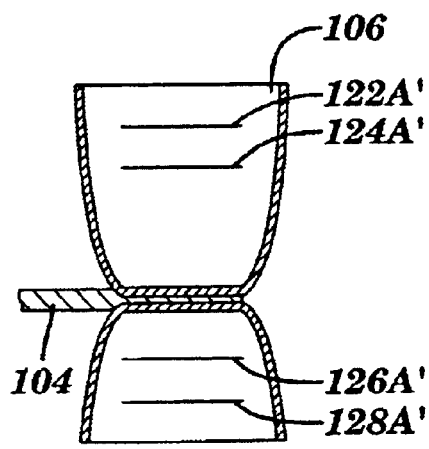
FIG. 7 is a section view of the measuring containers of FIG. 1 taken through a line 7—7.
Figure 8:
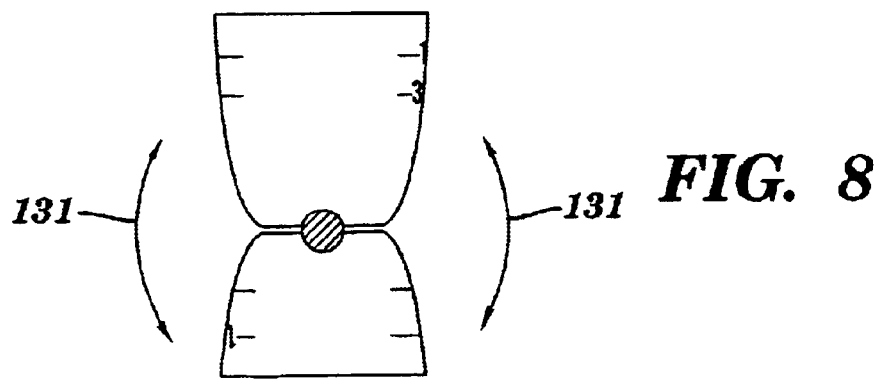
FIG. 8 is a section view of the measuring containers of FIG. 2 taken through a line 8—8.

FIG. 7 shows a section view of the measuring device 120. The first measuring container 106 preferably has fill lines 122A' and 124A' on the inside surface of the container and the second measuring container 108 has fill lines 126A' and 128A' on the inside surface of the container. FIG. 8 shows a view of the measuring device 120 looking from the handle 102.

The invention is susceptible to modification. For example, the same concept of the invention may be used for providing a cooking accessory which may be either of limited purpose or general purpose. For example, for bread or cake baking purposes, the measuring device may include, for example, one cup and ½ cup sizes, while preprogrammed recipes may include cake and bread recipes. In yet another embodiment, the device may be used, for example, for measuring quantities of concentrated fertilizers and/or insecticides, pesticides, etc. which are diluted before use. In such case, the preprogrammed recipes would include recipes for feeding and/or treating various vegetable and/or flower plants. Also, in such embodiment, the memory may include a calendar, including text for advising frequency of feeding and/or treatment and for creating a record of feedings and/or treatments. In yet another, embodiment, the device may be used for providing measured quantities of, for example, supplements for pets or livestock. In such case, the memory may include, for example, identification of the particular pet or animal, and that animal's supplement regiment.

Yet other possibilities include, for example, artist's tools, e.g. for mixing paints where the memory includes memories for different colors. Also, if desired, additional measuring containers may be affixed to the opposite end of handle portion 102. Alternatively, a mixing paddle or the like may be attached to the opposite end of handle portion 102.

It should be understood that, while the present invention has been described in detail herein, the invention can be embodied otherwise without departing from the principles thereof, and such other embodiments are meant to come within the scope of the present invention as defined in the following claims.

We claim:

1. A hand-held bar tool, comprising:
   a handle,
   an electronic display for displaying a drink recipe, coupled to the handle;

a measuring device extending from the handle for measuring ingredients; and a controller for determining text to be displayed on the display, wherein the controller displays a next ingredient in the recipe when a sensor senses rotation of the handle.

2. The bar tool of claim 1, wherein the measuring device comprises a first and a second measuring container.

3. The bar tool of claim 2, wherein the first measuring container has a volume capacity larger than the second container.

4. The bar tool of claim 1, further comprising a memory for storing a plurality of drink titles.

5. The bar tool of claim 4, further comprising an actuator for scrolling through the plurality of drink titles stored in the memory.

6. The bar tool of claim 4, wherein each drink title has an associated list of ingredients stored in the memory.

7. The bar tool of claim 6, further comprising an actuator for scrolling through the list of ingredients stored in the memory.

8. The bar tool of claim 4, further comprising a communications port for changing the memory.

9. The bar tool of claim 1, wherein the display displays text.

10. The bar tool of claim 1, wherein the display displays icons.

11. The bar tool of claim 1, wherein the measuring device is removable from the handle.

12. The bar tool of claim 1, wherein the measuring device is rotatable in the handle.

13. A tool comprising:

a handle, an electronic display for displaying a drink recipe, coupled to the handle;

a controller for determining text to be displayed on the display wherein the controller displays a next ingredient in the recipe when a sensor senses rotation of the handle; and a measuring device extending from the handle for measuring ingredients.

* * * * *